(No Model.)
M. HARMON.
DUST COLLECTOR.
No. 515,767. Patented Mar. 6, 1894.
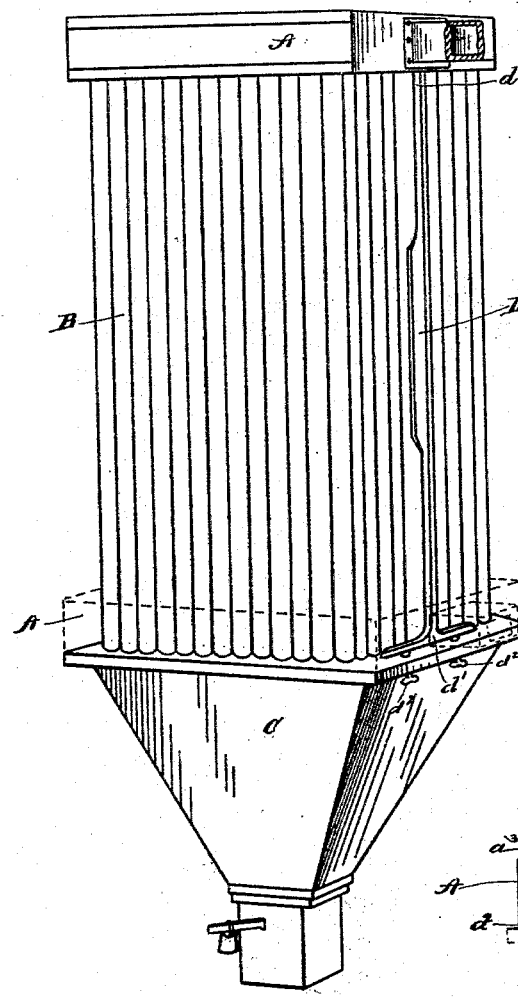
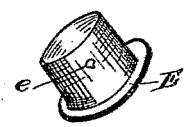
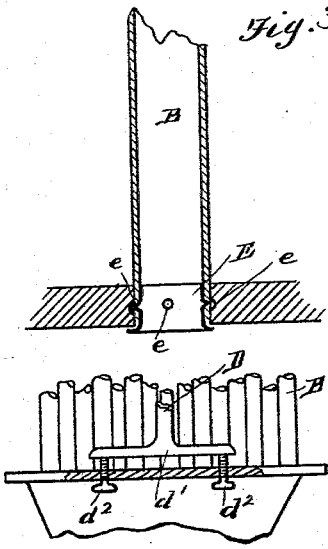
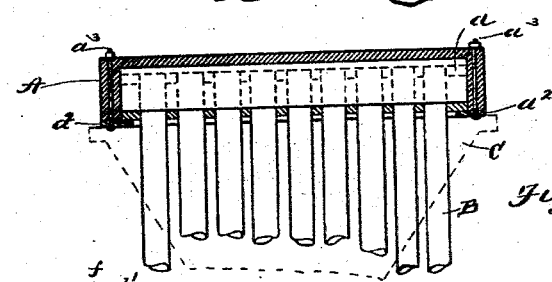
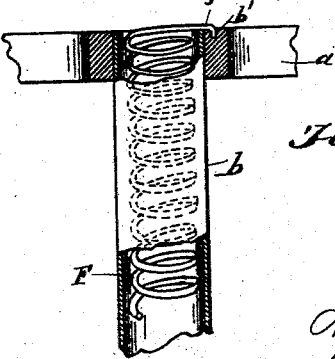
WITNESSES
F. Clough.
D. W. Bradford
INVENTOR
Milford Harmon
by Parker & Benton
Attorneys.
THE NATIONAL LITHOGRAPHING COMPANY,
WASHINGTON, D. C.

UNITED STATES PATENT OFFICE.

MILFORD HARMON, OF JACKSON, MICHIGAN.

DUST-COLLECTOR.

SPECIFICATION forming part of Letters Patent No. 515,767, dated March 6, 1894.

Application filed April 27, 1893. Serial No. 472,049. (No model.)

*To all whom it may concern:*

Be it known that I, MILFORD HARMON, a citizen of the United States, residing at Jackson, county of Jackson, State of Michigan, have invented a certain new and useful Improvement in Dust-Collectors; and I declare the following to be a full, clear, and exact description of the same, such as will enable others skilled in the art to which it pertains to make and use the same, reference being had to the accompanying drawings, which form a part of this specification.

My invention relates to dust collectors, and consists in certain improvements, all of which are fully described in the following specification thereof.

In the drawings, Figure 1 represents a perspective view of the dust collector, containing the improvements in question. Figs. 2 and 3 illustrate the thimble and mode of fastening the canvas tubes in the heads or flue sheets. Fig. 4 illustrates a stretching device. Fig. 5 represents, in connection with Fig. 1, a mode of construction permitting of packing into a small compass. Fig. 6 illustrates a guard interposed in the canvas tubes to protect them from blocks of wood or heavy angular material, where the dust collector is used in wood working factories, &c., or where it may be required.

Similar letters refer to similar parts.

In the drawings, A indicates the dust chamber into which the dust is driven by a fan or other appropriate means, and as these are common, and as there is no novelty in relation to them, they are not illustrated or described.

B is a nest of canvas tubes of relatively small diameter and thickly set, extending from the dust chamber to the hopper C. This hopper in itself is of the usual construction, with the exception of the upper flue sheet receiving the canvas tubes, which is identical in structure with the bottom of the dust chamber.

Upon either side of the nest of tubes B, extends a rigid member, one of which is shown in Fig. 1 at D. The upper end of these members, as shown at $d$, rests rigidly against the lower edge of the outer portion or casing of the dust chamber A. The lower end, $d'$, of this member has a T or cross bar. This is more particularly shown in Fig. 4. This T does not reach quite to the upper portion or flue sheet of the hopper C, but is separated therefrom by means of two thumb screws, $d^2$, $d^2$. These screws engage in a thread in the flange of the flue sheet of the hopper C, and impinge against the extremities of the cross bar $d'$. As the cross bar is made relatively thin, to allow it to spring, it thus becomes a spring by means of which the tension upon the flues or tubes B can be adjusted.

In Fig. 3 is shown a sectional view of the manner of inserting the canvas tubes into the flue sheets of the dust chamber and hopper respectively. It has been found very difficult to fasten them in place by means of tacks or equivalent means, and hence I have devised the means illustrated in Figs. 2 and 3.

In inserting the flues, it is preferable to use glue or paste, and fix them in the hole in the flue sheet so that they will be perfectly smooth all around, and then to insert a thimble E, as shown in Fig. 2, which is made preferably of tin. After temporarily fastening the canvas flues B into the flue sheets respectively, by means of the adherent heretofore described, the thimbles E are inserted inside of the flue extending through the flue sheet, they being so proportioned that, while they do not go in with a driving fit, yet they fit closely and snugly, and thus retain the canvas between the thimble and the flue sheet. While in this position, they are dented, as shown more particularly at $e$ $e$ in Fig. 3, the denting serving to hold them in place, and also to retain the canvas against any reasonable strain.

As these devices are difficult to transport, except inclosed in large boxes, when in the position shown in Fig. 1, I have devised a form of construction which permits them to be closely packed, and at the same time permits the flues to be inserted at the factory, and to inclose them in the packing. This is illustrated in Fig. 5, the packed form being shown by the dotted lines in Fig. 1. The upper flue sheet in the dust chamber A, as shown in Fig. 5 at $a$, is not rigidly fastened to the walls of the dust chamber, but, instead, is inclosed within the dust chamber, its sides fitting snugly therein. Upon the lower edge of the dust chamber is fastened a ledge $a^2\ a^2$, which projects around interiorly and forms a support for the upper flue sheet when the device is in the position as shown in Fig. 1, and under tension, which is the position shown in Fig. 5. As the ledge is removable by means of bolts, the canvas flues are first fastened to the flue sheet, the flue sheet then inserted into the dust chamber A in the position shown in Fig. 5, and then the ledge $a^2$ is fastened upon the lower edge of the dust chamber, thus holding the flue sheet in position, the fastening being any convenient means, as bolts, for instance, as shown at $a^3, a^3$. As the struts or rigid members D are removable by taking them out, the flues will collapse, and as the upper flue sheet in the dust chamber A is not fastened in position, it will slide to the top of the dust chamber, thus forming a space within which the flues will fold and can be securely covered. The ledge of the lower flue sheet, forming the upper portion of the hopper C, comes in contact with the lower edge or ledge of the dust chamber A, thus inclosing the flues in a box thus formed by the contact of the two, and protecting them from any injury in transportation. While in this position, the parts may be clamped or fastened together by any convenient means. The dotted line in Fig. 1 shows the position of the dust chamber A when thus in contact with the hopper C and the tubes are inclosed, the dotted lines in Fig. 5 showing the position of the upper flue sheet in the upper portion of the dust chamber A.

In the use of these dust collectors in planing mills and around wood working machinery, it very frequently happens that small blocks and chips are driven by means of the fan into the dust chamber and through the dust collector, and sometimes at a quite rapid rate of speed. As this would tend to cut and destroy the canvas flues, I have devised a means of protection, shown in Fig. 6. This means consists in removably inserting into each canvas flue, which is marked $b$ in the figure, an open coil of wire F, and which is slightly less in diameter than the flue $b$. The lower end of this coil is not attached to anything, and hangs perfectly free. The upper end of the coil at $f$ is extended above and over the edge of the flue sheet in the dust chamber A, and hooks into a hole therein, as shown in Fig. 6 at $b'$. This serves to support the coil in place, and as it is so nearly the diameter of the flue $b$, no relatively large objects can get between it and the flue sheet. As the coils are not tightly closed together, there is space sufficient to permit the air laden with dust to pass through between them, and, for the purpose of illustrating this, the spaces between the coils are exaggerated in the figure. In packing as hereinbefore described, the coils are removed and the dust collector packed as hereinbefore stated, the coils being packed separately.

It is obvious that other devices analogous to a coiled tube may be used, as, for instance, an open-work woven wire tube; or, a sheet iron tube perforated sufficiently to permit the passage of the air could be used in place of the coiled tube hereinbefore described. I do not therefore desire to limit myself to the particular form of tube, but deem the coil tube preferable, as it is more easy to construct, and is somewhat flexible.

This device can be used in connection with the closed air current, as well as with an open current, as the closed current forms no element in my invention, it is not deemed necessary to describe an apparatus of that character.

As the operation of this device is apparent from this description, it is deemed unnecessary to describe it in detail.

What I claim is—

1. In a dust collector composed of a series of canvas tubes or flues, the combination of the canvas tubes, a wooden flue sheet, formed with openings, and an inserted thimble adapted to be indented into the wooden flue sheet and to hold the canvas tube in position thereby, substantially as described.

2. In a dust collector, the combination of a dust chamber A, a hopper C, a nest of canvas tubes B connecting the two, and struts D carrying at their lower ends springs, and means connected with the hopper whereby such springs may be adjusted and thus create tension upon the tubes, substantially as and for the purpose specified.

3. In a dust collector, the combination of a dust chamber, a movable inserted flue sheet therein, removable means for holding said flue sheet inside of said dust chamber, a series of collapsible canvas tubes extending from said flue sheet to a flue sheet forming the upper portion of a receiving hopper, said tubes being adapted to collapse into the space in the dust chamber by the raising of the flue sheet contained therein, whereby the dust collector is adapted to be packed for transportation, substantially as described.

4. In a dust collector having a series of separating canvas tubes connecting a dust chamber with a dust collecting hopper, the combination of such tubes with a removable internal screen having side outlets for the dust laden air, and adapted to protect the canvas from the abrading action of coarse material, substantially as and for the purpose described.

In testimony whereof I sign this specification in the presence of two witnesses.

MILFORD HARMON.

Witnesses:
LEWIS M. POWELL,
GEO. F. DAY.